May 1, 1951     T. A. RICH     2,551,291
ELECTRIC VOLTAGE, CURRENT, AND PHASE-ANGLE
MEASURING INSTRUMENT
Filed Dec. 17, 1946

Inventor:
Theodore A. Rich,
by Prowell S. Mack
His Attorney.

Patented May 1, 1951

2,551,291

UNITED STATES PATENT OFFICE 2,551,291

ELECTRIC VOLTAGE, CURRENT, AND PHASE-ANGLE MEASURING INSTRUMENT

Theodore A. Rich, Schenectady, N. Y., assignor to General Electric Company, a corporation of New York Application December 17, 1946, Serial No. 716,684

8 Claims. (Cl. 171—95)

My invention relates to an electrical measuring apparatus for measuring voltage, total current, the inphase component of current, and the quadrature component of current in an electrical circuit from which measurements other desired quantities such as watts and reactive volt amperes may be calculated.

It is an object of my invention to provide a simple, light and sturdy instrument which is contained in a small volume and which utilizes only a single indicating device in measuring the various quantities previously enumerated.

The features of the invention which are believed to be novel and patentable will be pointed out in the claims appended hereto. For a better understanding of the invention reference is made in the following description to the accompanying drawings in which Fig. 1 is a diagram of connections of one embodiment of my invention; and Fig. 2 shows the circuit with test meters appropriately installed for adjusting the resistances in a rectifier bridge to proper balance.

Figure 1:
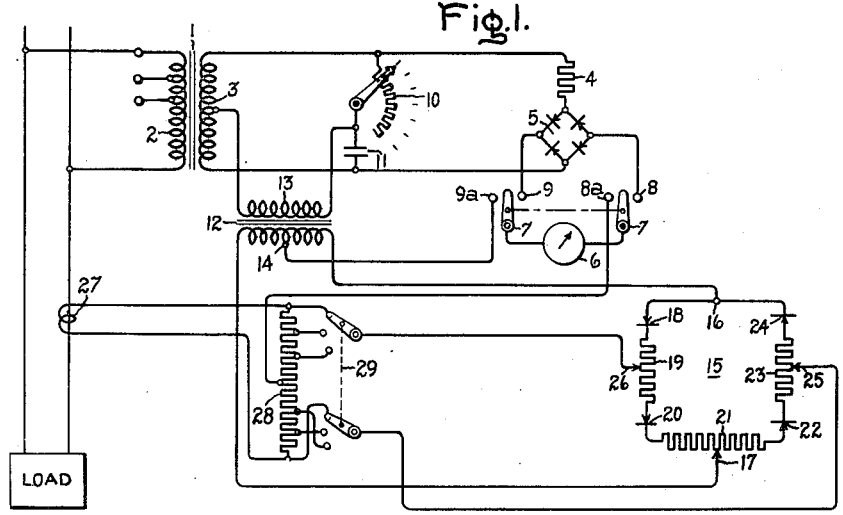
Figure 2:
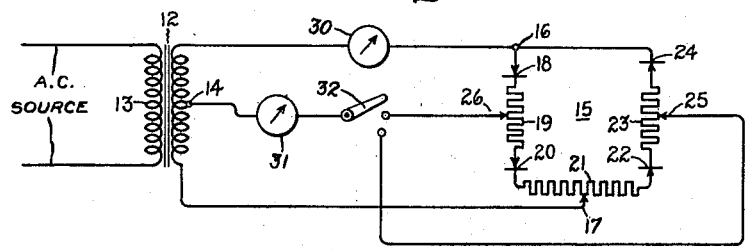

Referring to Fig. 1, a potential transformer 1 may be energized by connecting its primary coil to an A. C. source, preferably that source which supplies a load whose current requirements are to be ascertained. Primary coil 2 is tapped for use at different voltages such as 440, 220, and 110 volts as an example. Transformer 1 is provided with a center tapped secondary coil 3 across which a voltage measuring circuit including a resistance 4 and a rectifier bridge 5 are connected in series. A meter 6, preferably of a D. C. D'Arsonval volt-meter center scale type, is connected across the remaining terminals of rectifier bridge 5 when a double pole double throw switch 7 contacts its terminals 8 and 9. By this means meter 6 will indicate the voltage across the primary coil 2 of transformer 1 when switch 7 is in the position described.

The D'Arsonval type D. C. meter 6 may also be employed as a current measuring device for an A. C. circuit by introducing it into the remainder of the circuit of Fig. 1. This may be accomplished by causing switch 7 to contact terminals 8a and 9a respectively which terminals are part of a circuit to be described. It will be shown that this circuit includes commutating or rectifying means synchronously operated at an adjustable phase angle with respect to the A. C. current to be measured thereby controlling the ratio between the average value of the resultant rectified current and the effective value of the initial A. C. current in a manner dependent upon the phase relationship between the A. C. current and the source voltage causing its presence.

A phase shifting device consisting of serially connected variable resistance 10, which may be calibrated in degrees phase shift, and condenser 11 is connected across secondary 3 of transformer 1. The resulting voltage between the center tap of secondary 3 and the junction of resistor 10 and condenser 11 is impressed across the primary coil 13 of a transformer 12 which possesses a center tapped secondary coil 14.

A commutating device or rectifier ring 15 consists of a closed four-terminal ring comprising serially connected elements, rectifier 18, tapped balancing resistor 19, rectifier 20, tapped balancing resistor 21, rectifier 22, tapped balancing resistance 23, and rectifier 24 connected in the order named, and each rectifier is connected for current flow in the direction followed in enumerating the elements and in the same direction about the ring. A terminal 16 is provided between rectifiers 24 and 18 and is connected to one side of secondary coil 14 of transformer 12. An adjustable tap 17 on resistor 21 is connected to the remaining side of secondary coil 14 of transformer 12. An adjustable tap 25 on resistor 23 and an adjustable tap 26 on resistor 19 are similarly provided. If rectifiers of the type which offer relatively large resistance to current flow in the reverse direction are employed in rectifier ring 15 it is evident that taps 25 and 26 are alternately essentially disconnected from the circuit between taps 16 and 17 when an alternating voltage is supplied between taps 16 and 17.

To obtain a voltage dependent upon the current to be measured a current transformer 27 of a conventional type may be employed and a tapped potential divider resistor 28 connected across its terminals. A double pole multiposition switch 29 is provided whereby the total voltage or desired portions of the voltage across resistor 28 may be made available across switch 29. The voltage chosen by the position of switch 29 is made available to rectifier ring 15 by connecting the adjustable tap 25 on resistor 23 to one blade of switch 29 and the adjustable tap 26 of resistor 19 to the other blade of switch 29. Terminal 8a of switch 7 is connected to the center tap of resistor 28 and terminal 9a of switch 7 is connected to the center tap of secondary coil 14 of transformer 12, thereby connecting meter 6 between the center taps of secondary 14 and resistor 28 when switch 7 is moved to the proper position.

The operation of the circuit may be described in the following manner. When switch 7 Fig. 1 is positioned so as to contact terminals 8 and 9, meter 6 is subjected to a voltage or current directly dependent upon the voltage impressed across the primary 2 of transformer 1. The rectifying action of bridge 5 allows the current flow in meter 6 to be of a unidirectional pulsating type. Resistor 4 may be of such value as to allow meter 6 to operate within its proper range and to allow some convenient ratio between voltage impressed on transformer 1 and actual voltage across meter 6. Measurement of current flow in current transformer 27, either total or a component thereof, is obtained when switch 7 contacts terminals 8a and 9a respectively.

Operation of the rectifier ring 15 independent of its use in the total circuit of Fig. 1 is as follows: Rectifiers of the copper oxide type such as may be used in the rectifier ring display small opposition to current flow in one direction and a very much greater resistance to current flow in the opposite direction if the voltage impressed across it is sizable. Its resistance variation with voltage is such that it is essentially linear through a small range of voltages in either direction near zero value but departs from such linearity greatly when sizeable voltages are impressed across it. In other words, if a curve is plotted of the forward resistance of a rectifier versus the voltage applied across the rectifier, such curve has a pronounced slope for small voltage values, then the curve passes through a "knee" and flattens out to a substantially constant resistance value for larger voltage values. It is only with voltages large enough to reach this flat region of the rectifier characteristic curve that large ratios of reverse to forward resistance are obtained and true rectifier action is produced, in which the rectifier acts essentially as a directional switch to permit appreciable flow of current in only one direction. It is this true rectifier characteristic which is employed in the operation of rectifier ring 15 in accordance with my invention. This is accomplished by employing only sizeable voltages across each rectifier of the ring, such voltages having sufficiently large values to extend well into the flat portion of the resistance versus voltage characteristic of the rectifiers. If small instrument type rectifiers are employed resistance to current flow in one direction may be approximately 100 ohms and in the neighborhood of 100,000 ohms in the opposite direction. Thus when a voltage is impressed between diametrically opposite terminals such as terminal 16 and tap 17 and of such polarity that terminal 16 is positive with respect to tap 17, rectifiers 18 and 20 offer little opposition to current flow through them while rectifiers 22 and 24 permit only negligible current flow through them. Conversely when tap 17 is positive with respect to 16, rectifiers 22 and 24 are now of small resistance while rectifiers 18 and 20 permit only small current flow. Thus although the resistance to current flow in the reverse direction is not infinite, the ratio of reverse to forward resistance in the rectifiers is large and substantially constant. Thus rectifier ring 15 is analogous to a switch wherein tap 26 possesses definite voltage position with respect to terminal 16 and tap 17 when terminal 16 is positive and tap 25 is essentially electrically isolated from terminal 16 and tap 17. Conversely, when tap 17 is positive with respect to terminal 16, tap 25 assumes a definite voltage relationship with respect to tap 17 and terminal 16 while tap 26 is essentially electrically isolated from tap 17 and terminal 16.

In Fig. 1 the voltage of secondary coil 14 is made large and is also made large compared to any voltage which may exist across resistor 28. Thus rectifier ring 15 becomes essentially a switching device wherein tap 26 is connected essentially midway between terminal 16 and tap 17 during one half cycle and tap 25 is similarly connected during the next half cycle of the A. C. voltage impressed between terminal 16 and tap 17 by secondary coil 14 of transformer 12. Taps 17, 25, and 26 are adjusted by a method to be described so that tap 25 is midway between 16 and 17 for one polarity and tap 26 is midway between 16 and 17 for the opposite polarity of the sizeable voltage impressed between 16 and 17.

When a voltage appears across secondary 14 as caused by an impressed voltage of a given frequency across primary 2 of transformer 1 and a voltage also appears across resistor 28 because of current flow of the same frequency in transformer 27 and these voltages are in phase or may be made so by proper adjustment of resistor 10 the following conditions prevail: When terminal 16 is positive with respect to tap 17, tap 26 for a properly balanced rectifier ring 15 is midway between 16 and 17 as to potential. Therefore, tap 26 and the center tap of secondary 14 are at the same potential. Thus the potential existing in resistor 28 between its center tap and the tap to which 26 is connected by switch 29 is impressed across meter 6 and measured thereby. During the next half cycle tap 25 is similarly at the same potential as the center tap of secondary 14 and the potential between the center tap of resistor 28 and the tap to which tap 25 is connected by switch 29 is impressed across meter 6 and measured thereby. Therefore, meter 6 is subjected to a rectified voltage of an amount proportional to the voltage across resistor 28 or proportional to the amount of current flow in transformer 27. Similarly, if the voltage across secondary 14 of transformer 12 and the voltage across resistor 28 are 180° out of phase, meter 6 is subjected to a rectified voltage of an amount proportional to the voltage across resistor 28 but the polarity of the voltage across the meter will have reversed.

If the voltages of coil 14 and resistor 28 are 90 degrees out of phase with respect to each other, it follows from the above discussion that terminal 26 will be at a potential equal to that of the center tap of coil 14 from the instant that the voltage across resistor 28 is maximum in one direction until it is maximum in the opposite direction. During the next half cycle tap 25 is similarly connected. Therefore, the voltage impressed across meter 6 varies from a maximum value dependent upon the current in transformer 27 to a maximum value in the opposite direction for each half cycle of the voltage across coil 14 and meter 6 will therefore have no deflection since the average current is zero. For phase displacements greater than zero degrees and less than 90 degrees it is apparent that the resultant average voltage across meter 6 will be dependent upon the degree by which the two voltages are out of phase with respect to each other as well as upon the magnitude of the current flow in transformer 27. Thus, since the phase relationship of the two voltages may be adjusted by the phase shifter consisting of variable resistor 10 and condenser 11 the total current flow in transformer 27, its inphase component, and its quadrature component with respect to the voltage across transformer 1 may be measured. When the phase-shifter is adjusted to get maximum reading on meter 6 its reading is the total line current and the phase angle will be known from the calibrated phase shifter.

It will be apparent to those skilled in the art that the voltage appearing across the secondary 3 of transformer 1 may be derived from current or voltage conditions in any electrical system and the voltage appearing across resistor 28 may be similarly derived from current or voltage conditions in any other separate electrical system. Thus, meter 6 may be employed to indicate the degree of instantaneous phase displacement between measured quantities in the two separate circuits. When utilized in this fashion, it is apparent that meter 6 functions as a synchroscope, and it is hereby pointed out that such a use is included within the scope of my invention.

Rectifiers of the copper oxide type are not identical one with the other and will therefore vary as to the amount of resistance which they offer to current flow in the favored direction. Since it is desirable as evident from the above discussion that tap 26 or 25 be midway between terminal 16 and tap 17, taps 25 and 26 as well as tap 17 are made adjustable so as to improve the accuracy of operation. However, it is apparent that the device operates essentially as described if the balancing impedances are removed from the rectifier ring. It will also be appreciated that 14 and 28 need not necessarily be a transformer secondary and a resistor, respectively. Transformers could be used in both places, or equivalent voltage dividing means such as center-tapped inductors or capacitor voltage dividers may be employed. It is intended that the term "voltage divider" as used herein with reference to elements 14 and 28 should include all such equivalents.

In Fig. 2 the desired connections to the rectifier ring 15 for balancing the ring by adjusting taps 17, 25, and 26 are shown. Rectifier ring 15 is energized across terminals 16 and 17 by transformer 12 as in Fig. 1. However, a meter 30, preferably of a D. C. D'Arsonval ammeter type, is inserted in one of the leads from transformer 12 to the rectifier ring 15. Taps 25 and 26 are connected to respective contact points of a switch 32 whose contact arm is connected to the center tap of secondary 14 through an ammeter 31.

By utilizing the circuit shown in Fig. 2 the proper position of taps 17, 25 and 26 may be determined. Impressing a voltage across the primary 14 of transformer 12 in Fig. 2 while switch 32 remains open causes a current flow through meter 30 in one direction during one half cycle and in the opposite direction during the next half cycle. The magnitude of the current flow during the first half cycle is dependent upon the resistance in the path between 16 and 17 through resistor 19 and rectifiers 18 and 20 and the magnitude of the current flow during the next half cycle is dependent upon the resistance of the path between 17 and 16 through resistor 23 and rectifiers 22 and 24. Current flow in the reverse direction through the two rectifiers in series is negligibly small. The resistance of these two paths may be changed by adjusting tap 17 until the indication of ammeter 30, which is of the D. C. type, becomes zero. A zero reading indicates that the current flow during each half cycle is equal and the resistance of the two paths must therefore also be equal. When tap 17 is adjusted in the above fashion the contact arm of switch 32 is made to contact that point to which tap 26 is connected while transformer 12 is still energized as before. Tap 26 is then adjusted until meter 31 indicates zero current flow through it. When such zero condition is reached it indicates that tap 26 remains at the same potential as the center tap of secondary 14. Tap 25 is similarly adjusted after the contact arm of switch 32 is made to contact that point which connected to tap 25.

Since rectifier ring 15 is to be employed in a manner such that the voltage impressed across terminals 16 and 17 is in all cases greater than that impressed across terminals 25 and 26, the balancing procedure need not be extended as by applying a voltage between taps 25 and 26. This is apparent when it is realized that in its intended operation rectifiers 18 and 24 or rectifiers 20 and 22 are never simultaneously in a state of minimum opposition to current flow.

If the device is to be used over a range of voltage values induced in the secondary coil 3 of transformer 2, it is advisable to check the balance obtained above at additional values of voltage impressed across the rectifier ring 15 between terminal 16 and tap 17. If the device should not remain essentially in balance over a range of such impressed voltages, the voltage-resistance characteristics of the several rectifiers are evidently sufficiently dissimilar so that accuracy over such range cannot be properly maintained. Substituting other rectifiers should remedy such a difficulty since rectifiers are usually sufficiently similar as to characteristics so that only negligible unbalance may be normally expected.

The balancing procedure described above is simple and straightforward. When rectifier ring 15 is once balanced respective positions of taps 17, 25 and 26 need not be changed since the characteristics of the copper oxide rectifiers will remain the same even after long usage of the device. Thus a simple, accurate and compact measuring device possessing only a single moving indicating element and capable of measuring voltage and the various components of current and the phase angle or power factor in any medium or low frequency circuit is provided by my invention. Phase angle may be read directly from that setting of the calibrated resistor 10 which causes maximum reading of meter 6, or may be calculated from the values of the various components of current which the apparatus easily obtains.

As will occur to those skilled in the art various different arrangements and combinations of the principles described above may be employed without departing from the true spirit and scope of the invention and I, therefore, do not wish to limit my invention to the particular arrangement described.

What I claim as new and desire to secure by Letters Patent of the United States is:

1. Measuring apparatus comprising a ring circuit containing four rectifiers in series and connected for minimum opposition to current flow in one direction only about such ring, a center tapped voltage divider connected to impress a first A.-C. voltage across a first set of two serially connected rectifiers of said ring, a second center tapped voltage divider connected to impress a second A.-C. voltage across a second set of two serially connected rectifiers of said ring, said second A.-C. voltage being sufficiently great to operate the rectifiers in the region in which the ratio of reverse to forward resistance is substantially constant and also being much greater than said first A.-C. voltage, the parallel ring circuits between the points of connection of each of said A.-C. voltages being of equal impedance, and a direct current responsive instrument connected between the center tap of said two voltage dividers.

2. Measuring apparatus comprising a ring circuit containing four rectifiers in series and connected for minimum opposition to current flow in one direction only about such ring, a center tapped voltage divider connected to impress a measurement A.-C. voltage across a first set of two serially connected rectifiers of said ring, a second center tapped voltage divider connected to impress a greater A.-C. voltage across a second set of two serially connected rectifiers of said ring, the two A.-C. voltages being of the same frequency, said greater A.-C. voltage being sufficiently great to operate the rectifiers in the region in which the ratio of reverse to forward resistance is substantially constant so that the rectifiers act substantially as a commutating or switching device, the parallel ring circuits between the points of connection of each of said A.-C. voltages being of equal impedance, and a direct current measuring instrument connected between the center tap of said two voltage dividers.

3. In combination, a four-terminal ring circuit having four legs of equal impedance, each leg of said ring circuit containing at least one true rectifier, all of said rectifiers being connected to permit appreciable flow of current in the same direction around said ring circuit, first and second center-tapped voltage dividers connected between respective pairs of diagonally opposite terminals of said ring circuit, means to apply first and second alternating voltages across said first and second voltage dividers respectively, said second voltage being larger than said first voltage, said second voltage also being sufficiently large to operate said rectifiers in the flat portion beyond the knee of their resistance versus voltage characteristic, in which portion the rectifiers have a substantially constant forward resistance and a large ratio of reverse to forward resistances, and direct-current responsive apparatus connected between the center taps of said voltage dividers.

4. In combination, a four-terminal ring circuit having four legs of equal impedance, each leg of said ring circuit containing at least one resistor and one true rectifier connected in series, all of said rectifiers being connected to permit appreciable flow of current in the same direction around said ring circuit, first and second center-tapped voltage dividers connected between respective pairs of diagonally opposite terminals of said ring circuit, means to apply first and second alternating voltages across said first and second voltage dividers respectively, said second voltage being larger than said first voltage, said second voltage also being sufficienly large to operate said rectifiers in the flat portion beyond the knee of their resistance versus voltage characteristic, in which portion the rectifiers have a substantially constant forward resistance and a large ratio of reverse to forward resistances, and direct-current responsive apparatus connected between the center taps of said voltage dividers.

5. Current measuring apparatus comprising a ring circuit containing four rectifiers in series and connected for minimum opposition to current flow in one direction only about such ring, a center tapped voltage divider connected to impress an A.-C. voltage across a first set of two serially connected rectifiers of said ring, said A.-C. voltage being adjustably fixed in phase relationship to and derived from a reference voltage, a second center tapped voltage divider connected to impress a smaller A.-C. voltage across a second set of two serially connected rectifiers of said ring, said smaller A.-C. voltage being fixed in phase relationship to and dependent in magnitude upon the current flow in a circuit energized by said reference voltage, impedances inserted into said ring circuit in series with said rectifiers in such manner and of such value that the minimum opposition to current flow is the same between any two adjacent connections to said ring, and a direct current measuring instrument connected between the center taps of said two voltage dividers.

6. A current and phase-angle measuring instrument comprising a four-legged rectifier ring the legs of which have equal impedances and have much greater impedances to current flow in one direction around such ring than to current flow in the other direction, means including a center-tapped voltage divider connected to impress across two diagonally opposite corners of said ring a first A.-C. voltage derived from and adjustably fixed in phase relationship to a reference voltage, a calibrated adjustable phase-shifter for adjusting the phase angle between said first A.-C. voltage and said reference voltage to substantially any desired value between 90° leading and 90° lagging, means including a second center-tapped voltage divider connected to impress across the other two diagonally opposite corners of said ring a second and smaller A.-C. voltage dependent in magnitude upon and fixed in phase relationship to the measured current, and a D.-C. measuring instrument connected between the respective center taps of said two voltage dividers.

7. A current and phase-angle measuring instrument comprising a four-legged rectifier ring the legs of which have equal impedances and have much greater impedances to current flow in one direction around said ring than to current flow in the other direction, a potential transformer having a center-tapped secondary, a calibrated phase shifter comprising a variable resistor and a capacitor in series connected across the secondary of said potential transformer, a second transformer having its primary connected between the center tap of said potential transformer secondary and the juncture of said variable resistor and capacitor and having a center-tapped secondary connected across two diagonally opposite corners of said rectifier ring, a current transformer having a secondary connected across the other two diagonally opposite corners of said rectifier ring, a center-tapped impedance also connected across said current transformer secondary, and a D.-C. measuring instrument connected between the center tap of said second transformer secondary and the center tap of said impedance.

8. A voltage, current, and phase-angle measuring instrument comprising a four-legged rectifier ring the legs of which have equal impedances and have much greater impedances to current flow in one direction around said ring than to current flow in the other direction, a potential transformer having a center-tapped secondary, a calibrated phase-shifter comprising a variable resistor and a capacitor in series connected across the secondary of said transformer, a second transformer having its primary connected between the center tap of said potential transformer secondary and the juncture of said variable resistor and capacitor and having a center-tapped secondary connected across two diagonally opposite corners of said rectifier ring, a current transformer having a secondary connected across the other two diagonally opposite corners of said rectifier ring, a center-tapped impedance also connected across said current transformer secondary, an additional rectifier having its input connected across the secondary of said potential transformer, a D.-C. measuring instrument, and switching means for connecting said D.-C. instrument between the center tap of said second transformer secondary and the center tap of said impedance or across the output of said additional rectifier selectively.

THEODORE A. RICH.

REFERENCES CITED

The following references are of record in the file of this patent:

UNITED STATES PATENTS

| Number | Name | Date |
| --- | --- | --- |
| 1,929,216 | Pfannenmuller | Oct. 3, 1933 |
| 2,282,396 | Cravath | May 12, 1942 |